(12) United States Patent
Commaret et al.

(10) Patent No.: US 7,861,529 B2
(45) Date of Patent: Jan. 4, 2011

(54) DEVICE FOR INJECTING A MIXTURE OF AIR AND FUEL, AND COMBUSTION CHAMBER AND TURBOMACHINE BOTH EQUIPPED WITH SUCH A DEVICE

(75) Inventors: Patrice Andre Commaret, Rubelles (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 792 days.

(21) Appl. No.: 11/768,603

(22) Filed: Jun. 26, 2007

(65) Prior Publication Data
US 2008/0178598 A1 Jul. 31, 2008

(30) Foreign Application Priority Data
Jun. 29, 2006 (FR) .................................. 06 05854

(51) Int. Cl.
*F02C 7/22* (2006.01)
(52) U.S. Cl. .......................................... 60/742; 60/748
(58) Field of Classification Search .................. 60/740, 60/746, 748, 737, 742
See application file for complete search history.

(56) References Cited

U.S. PATENT DOCUMENTS

| | | | |
|---|---|---|---|
| 2,638,745 A * | 5/1953 | Nathan | 60/748 |
| 3,703,259 A | 11/1972 | Sturgess et al. | |
| 4,265,615 A * | 5/1981 | Lohmann et al. | 431/353 |
| 6,035,645 A * | 3/2000 | Bensaadi et al. | 60/742 |
| 6,571,559 B1 * | 6/2003 | Fortuna et al. | 60/748 |
| 6,820,425 B2 * | 11/2004 | David et al. | 60/743 |
| 6,834,505 B2 * | 12/2004 | Al-Roub et al. | 60/737 |
| 2002/0050139 A1 * | 5/2002 | Le Gal et al. | 60/742 |
| 2003/0010034 A1 * | 1/2003 | Baudoin et al. | 60/740 |
| 2007/0006587 A1 * | 1/2007 | Ohta et al. | 60/746 |
| 2007/0125085 A1 * | 6/2007 | Commaret et al. | 60/748 |
| 2007/0269757 A1 * | 11/2007 | Commaret et al. | 431/265 |

FOREIGN PATENT DOCUMENTS

| | | |
|---|---|---|
| EP | 1 278 012 A2 | 1/2003 |
| FR | 2 753 779 A1 | 3/1998 |

OTHER PUBLICATIONS

U.S. Appl. No. 11/768,421, filed Jun. 26, 2007, Commaret, et al.
U.S. Appl. No. 12/190,105, filed Aug. 12, 2008, Commaret, et al.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

An injection device for injecting a mixture of air and fuel into a combustion chamber of a turbomachine is disclosed. The injection device includes two fuel circuits and a Venturi which improves the carburation.

7 Claims, 4 Drawing Sheets

DEVICE FOR INJECTING A MIXTURE OF AIR AND FUEL, AND COMBUSTION CHAMBER AND TURBOMACHINE BOTH EQUIPPED WITH SUCH A DEVICE

BACKGROUND OF THE INVENTION AND DESCRIPTION OF THE PRIOR ART

The invention relates to the field of turbomachines and an injection device for injecting a mixture of air and fuel into a combustion chamber of a turbomachine.

It is more specifically concerned with an injection device equipped with two fuel circuits and relates to a novel Venturi the shape of which improves the carburation.

In the description which follows, the terms "upstream" or "downstream" will be used to denote the positions of structural elements relative to one another in the axial direction, the point of reference taken being the direction in which the gases flow. Likewise, the terms "internal" or "radially internal" and "external" or "radially external" will be used to denote the positions of the structural elements relative to one another in the radial direction, taking the axis of rotation of the turbomachine as the reference.

A turbomachine comprises one or more compressor(s) delivering pressurized air to a combustion chamber in which the air is mixed with fuel and ignited in order to create hot combustion gases. These gases flow towards the downstream end of the chamber towards one or more turbine(s) used to convert the energy thus received in order to drive the compressor(s) and provide the work needed, for example, to power an aircraft.

Typically, a combustion chamber used in aeronautics comprises an internal wall and an external wall, these walls being joined together at their upstream end by a chamber end wall. The chamber end wall has, circumferentially spaced, a number of openings each housing an injection device that allows the mixture of air and fuel to be conveyed into the chamber. Each injection device particularly comprises a fuel injector, radial swirl vanes, a Venturi, a bowl and a deflector, all joined together, the chamber end wall being fixed to the deflector.

The combustion chamber is supplied with liquid fuel, mixed with the air from a compressor. The liquid fuel is conveyed as far as the chamber by the injectors in which the fuel is vaporized into fine droplets. This vaporization is initiated at the injector by nozzles and is continued in the Venturi and the bowl under the effect of the pressurized air from a compressor. This pressurized air passes, on the one hand, between the radial swirl vanes of the injection device in order to cause the fuel sprayed by the injector to swirl and, on the other hand, through the orifices formed in various parts of the injection device, such as the bowl.

There are several types of injector: injectors through which a single fuel supply circuit runs and those through which two fuel supply circuits run.

In the case of injectors that have two fuel circuits, a first circuit, termed the primary circuit or idle circuit, operates alone between turbomachine ignition and a first rotational speed of the turbomachine that corresponds to the idling speed. A second circuit known as the secondary circuit or full throttle circuit, then operates together with the primary circuit between the rotational speed corresponding to the idling speed and a second rotational speed that corresponds to full throttle, that is to say to the highest rotational speed of the turbomachine.

The fuel may be injected into the combustion chamber either directly or indirectly. It is said to be direct injection when the fuel does not strike any other part between leaving the injector and reaching the combustion chamber. It is said to be indirect injection when the fuel, having left the injector, strikes some other part before reaching the chamber. Generally, the part struck is the Venturi of the injection device.

As illustrated in document FR 2 753 779, the angle of the sheet of fuel from the primary circuit, which forms a cone of fuel, is generally defined in such a way that the fuel never strikes the Venturi and that injection in the primary circuit is therefore direct injection, whereas injection in the secondary circuit is indirect injection, the fuel striking the Venturi as it leaves the injector. An arrangement such as this makes it possible to get around the negative effects observed when the sheet of fuel of the primary circuit also strikes the Venturi. These negative effects are a prohibitive increase in the angle of the sheet of fuel leaving the Venturi and an increase in the droplet size. This causes unvaporized fuel to be sprayed on to the walls of the combustion chamber and leads to significant amounts of carbon monoxide and unburnt hydrocarbons being formed.

However, the fact that the injection in the primary circuit is direct injection means that when the primary circuit is operating alone, the Venturi is not struck with fuel and is therefore not cooled whereas when the primary and secondary circuits are operating, it is. Hence, the Venturi experiences significant variations in temperature which encourage the formation of coke.

SUMMARY OF THE INVENTION

The objective of the invention is to limit the variations in temperature experienced by the Venturi and thus limit or even eliminate the formation of coke on this part.

The invention is able to solve this problem by proposing an injection device comprising a Venturi the geometry of which is such that, when associated with a nozzle, the spray angle of which is contained within a certain range, the sheet of fuel leaving the primary circuit, on leaving the injector, lightly strikes the Venturi.

Thus, it has been found, surprisingly and counter to the preconceived ideas described in particular in document FR 2 753 779, that in spite of the negative effects that occur when the sheet of fuel of the primary circuit strikes the Venturi too greatly, these effects disappear in favor of beneficial effects, particularly in terms of the formation of coke, when the impact is light.

More specifically, the invention is concerned with a turbomachine combustion chamber fuel supply assembly comprising:
 a dual-flow fuel injector intended to inject a primary flow of fuel delivered by a primary fuel supply circuit and a secondary flow of fuel delivered by a secondary fuel supply circuit,
 the primary flow of fuel forming a cone of fuel formed by the primary and secondary flows of fuel,
 a device for injecting the fuel from the injector, the injection device having symmetry of revolution about an axis and comprising, positioned from the upstream direction downstream in the direction in which the flow of fuel flows, a sliding bushing at the center of which the injector is positioned, radial swirl vanes connected by their downstream end to a bowl, the radial swirl vanes comprising a Venturi equipped with an interior wall that has an evolving profile made up of a convergent upstream part connected to a divergent downstream part by a transition region, the Venturi having a minimum inside diameter at the transition region, notable in that the Venturi has a length, a shape and an axial position which are all designed such that the cone of fuel from the primary circuit strikes the Venturi, the cone of fuel having, downstream of the Venturi, a vertex half-angle β ranging between 30 and 40 degrees, and comprising a central first part and a peripheral second part, the central first part forming a cone with a vertex half-angle α0, this cone being tangential at a point A0 to the downstream divergent part of the Venturi, where α0 is less than β, the peripheral second part of the cone of which the vertex half-angle at the injector outlet ranges between α0 and β, and the cone of fuel, as it leaves the injector, striking the interior wall of the Venturi over a surface extending upstream of the point of tangency A0 as far as a point A1, this point A1 lying upstream of the minimum inside diameter of the Venturi.

α0 preferably ranges between 20 and 30 degrees.

As a preference, the point of tangency A0 between the cone of the central first part of the sheet of fuel and the divergent downstream part of the Venturi is defined by its distance L0 with respect to the downstream end of the injector and by its distance R0 with respect to the axis of the injection device, and L0 and R0 satisfy the relationship $$1.8 < \frac{L0}{R0} < 2.2.$$

Advantageously, the point A1 which delimits the upstream boundary of the surface of the Venturi struck by the sheet of fuel is defined by its distance L1 with respect to the downstream end of the injector and by its distance R1 with respect to the axis of the injection device, wherein R1 is equal to R0, and L1 and R1 satisfy the relationships R0=R1 and $$1.2 < \frac{L1}{R1} < 1.5.$$

Furthermore, the invention is also concerned with a combustion chamber comprising an internal wall, an external wall, a chamber end wall, and which is equipped with at least one such fuel supply assembly.

The invention is finally concerned with a turbomachine equipped with such a combustion chamber.

BRIEF DESCRIPTION OF THE DRAWINGS

The invention will be better understood and further advantages will become more clearly apparent in the light of the description of one preferred embodiment which is given by way of nonlimiting example and with reference to the attached drawings in which.

DESCRIPTION OF THE PREFERRED EMBODIMENT

Figure 1:
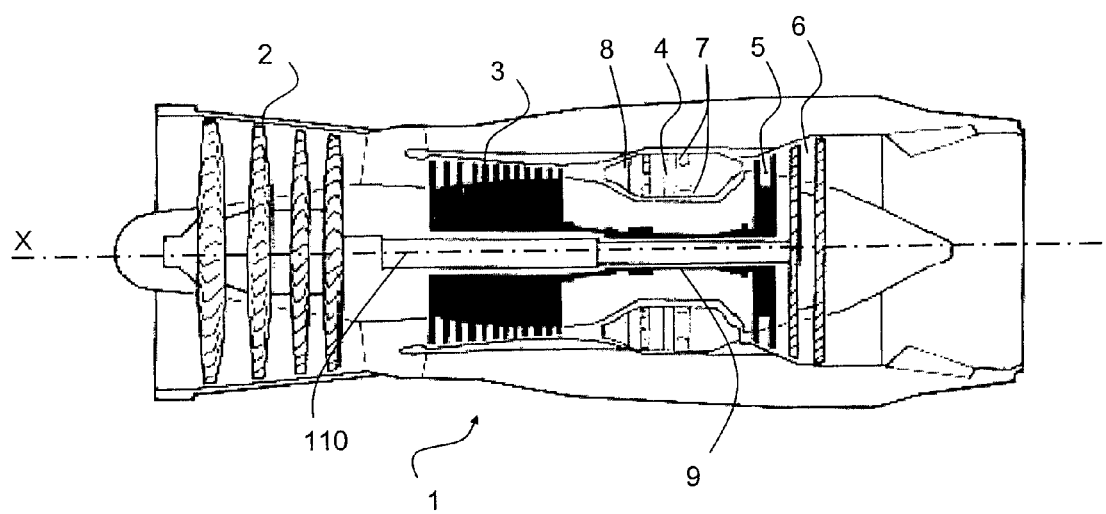
FIG. 1 is a schematic sectioned view of a turbomachine and more specifically of an aero jet engine.

FIG. 1 shows, in section, an overall view of a turbomachine 1, for example, an aero jet engine, comprising a low-pressure compressor 2, a high-pressure compressor 3, a combustion chamber 4, a low-pressure turbine 5 and a high-pressure turbine 6. The combustion chamber 4 may be of the annular type and is bounded by two annular walls 7 spaced radially apart with respect to the axis X of rotation of the jet engine, and connected at their upstream end to an annular chamber end wall 8. The chamber end wall 8 comprises a plurality of openings (not depicted) which are uniformly circumferentially spaced. Mounted in each of these openings is an injection device. The combustion gases flow in the downstream direction in the combustion chamber 4 and then go on to feed into the turbines 5 and 6 which respectively drive the compressors 2 and 3 positioned upstream of the chamber end wall 8, via two shafts 9 and 110 respectively. The high-pressure compressor 3 supplies air to the injection devices, and two annular spaces positioned radially one on the inside and one on the outside of the combustion chamber 4. The air introduced into the combustion chamber 4 contributes towards vaporizing the fuel and burning it. The air flowing along the outside of the walls of the combustion chamber 2 contributes towards cooling these walls and enters the chamber through dilution holes (not depicted) in order to cool the combustion gases transmitted to the turbine.

Figure 2:
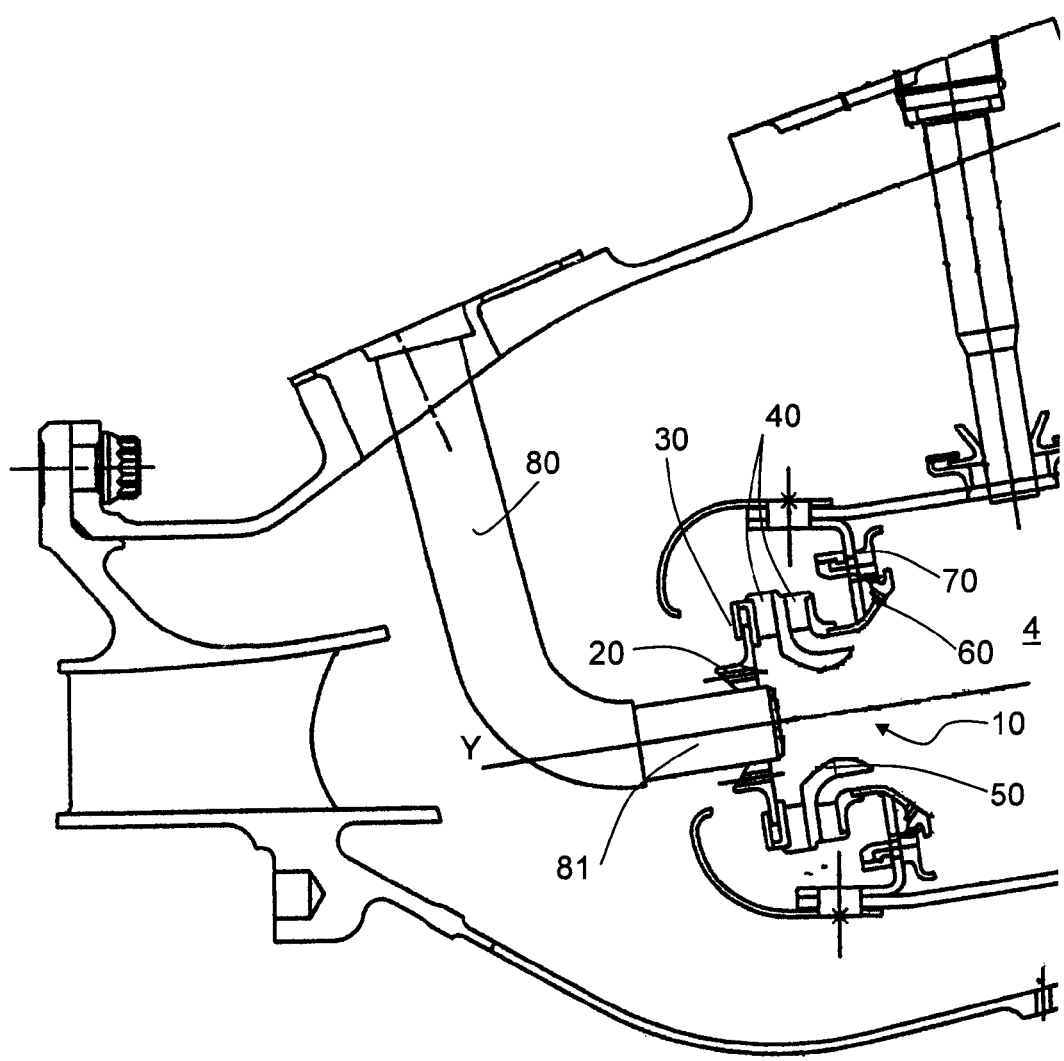
FIG. 2 is a schematic sectioned view of the upstream part of a combustion chamber equipped with an injection device according to the invention.

FIG. 2 shows, in section, one exemplary embodiment of an injection device 10 according to the invention. The injection device 10, the axis of symmetry of revolution of which is identified Y, comprises, positioned from the upstream direction downstream, an injector 80 positioned at the center of a sliding bushing 20 connected by an annular cup 30 to radial swirl vanes 40. The radial swirl vanes 40 comprise a Venturi 50 and are connected by the downstream end to a bowl 60 that has a divergent conical wall. The bowl 60 is itself connected to the chamber end wall 8 by a deflector 70.

The combustion chamber 4 is supplied with liquid fuel, mixed with air from a compressor. The liquid fuel is conveyed as far as the chamber by the injectors 80. The downstream end 81, also termed the head, of the injectors 80 is positioned within the injection device 10, at the center of the sliding bushing 20, so that the axis of symmetry of the head 81 of the injectors corresponds to the axis of symmetry of the sliding bushing. The injectors 80 are equipped with a nozzle 82 positioned within their head 81, at their downstream end. The nozzle 82 carburates the air-fuel mixture, this mixture leaving the injectors in a sheet. The sheet of vaporized fuel forms a cone 83 the vertex angle of which differs according to whether it is just one or both supply circuits that are operating. Thus, when the primary circuit is operating alone, the cone 83 has a vertex angle smaller than that obtained when the primary and secondary circuits are operating simultaneously. In addition, the angle of the cone 83 of fuel differs from one nozzle to another and is one of the characteristics that needs to be taken into consideration, during the design phase, when choosing a nozzle.

Figure 3:
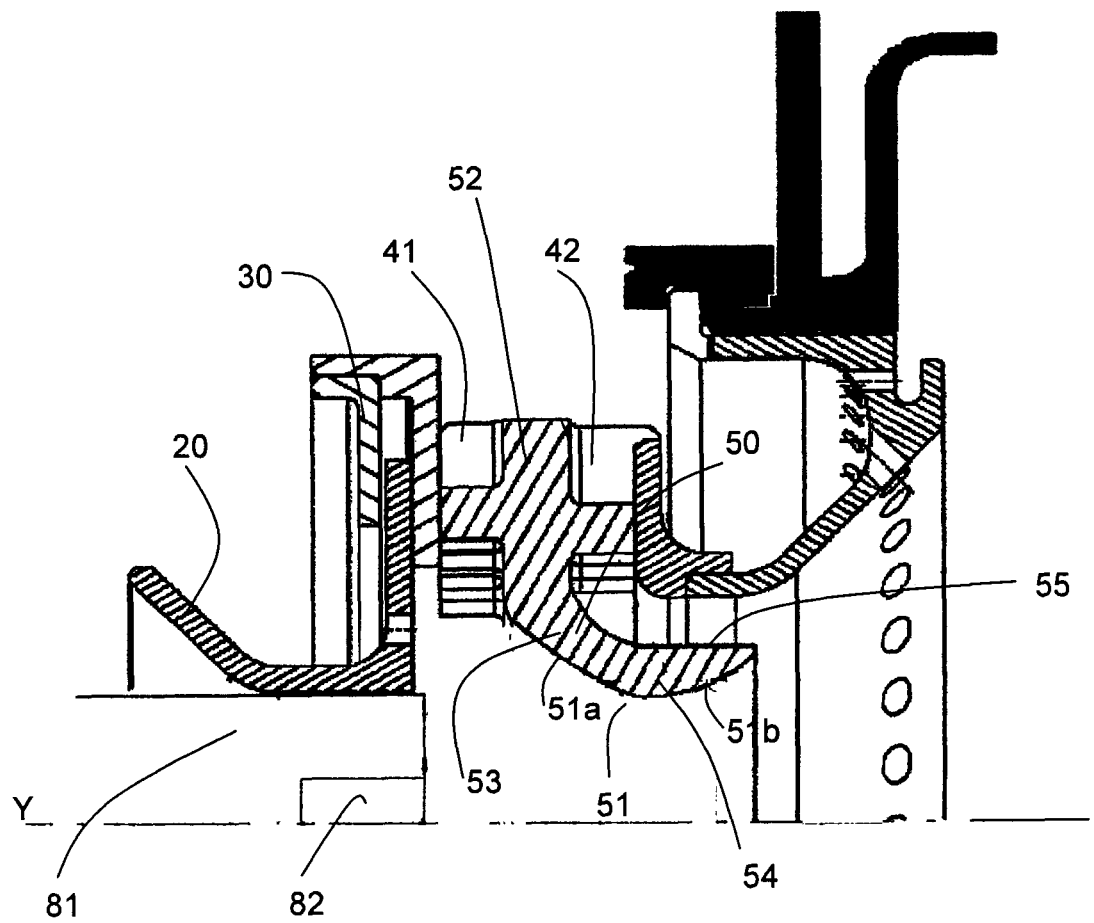
FIG. 3 and FIG. 4 are schematic sectioned views of an injection device according to the invention.

FIG. 3 shows a diagrammatic sectioned view of an injection device according to the invention.

The Venturi 50 positioned between two radial swirl vanes 41 and 42, has an interior wall 51 with an evolving profile made up of a convergent part 51a and of a divergent part 51b joined together by a transition region, the Venturi having a minimum diameter at the transition region. It is made up of an annular part 52 running radially and connected by its radially internal end to a convergent conical part 53 which is extended in the downstream direction in the form of a divergent part 54. The annular part 52 connects the Venturi 50 upstream to the radial swirl vane 41 and downstream to the radial swirl vane 42. The divergent part 54 has an external surface 55 and an internal surface. The external surface 55 is a cylinder of axis Y, while the internal surface widens and constitutes the divergent part 51b of the interior wall 51 of the Venturi.

Figure 4:
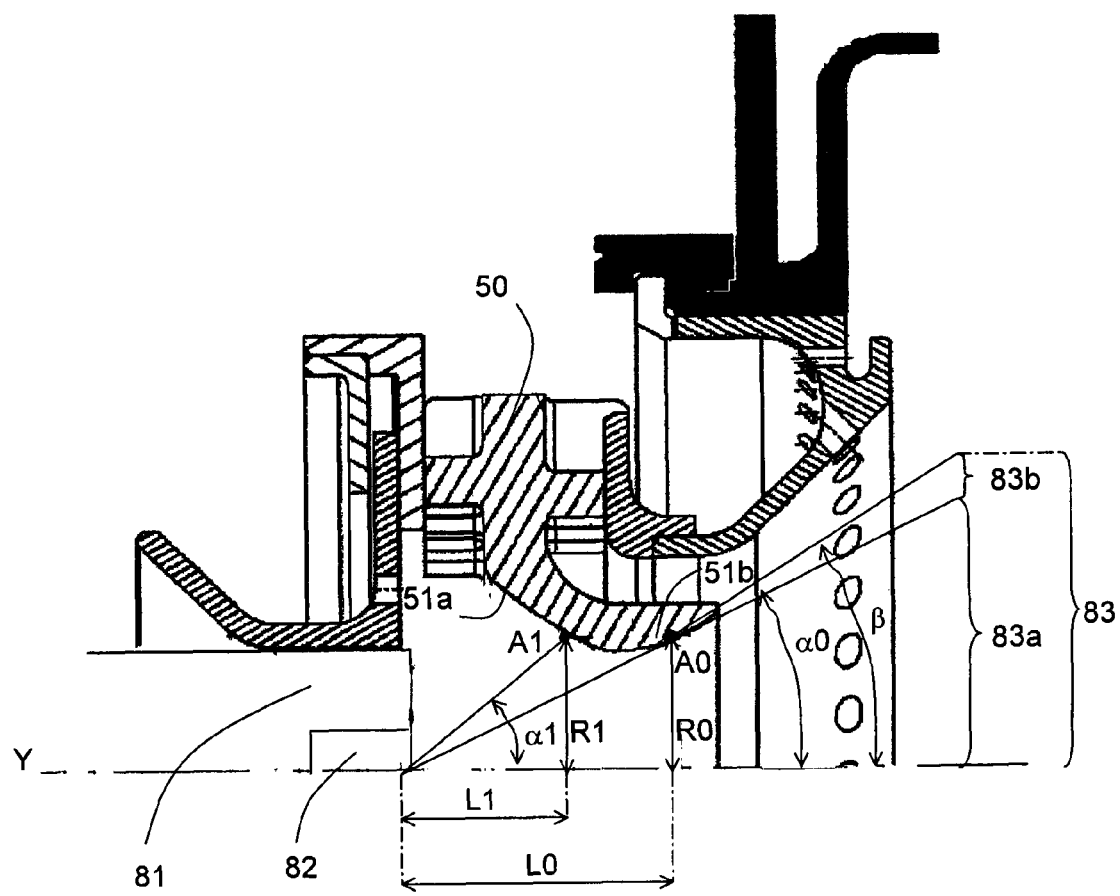

As illustrated in FIG. 4, the shape and dimensions of the Venturi 50 and the position of the downstream end of the head 81 of the injector 80, are calculated and the nozzle 82 is chosen and positioned in the axial direction in such a way that when the primary circuit is operating alone, the cone 83 of fuel can be broken down into two parts 83a and 83b each one corresponding to a different type of injection.

The sheet of fuel forms, as it leaves the injector, a cone 83 the vertex half-angle of which is identified α1, and, downstream of the Venturi 50, a cone the vertex half-angle of which is identified β. As a preference, β ranges between 30 and 40 degrees. The central first part 83a of the cone 83 is a central cone, the vertex half-angle of which is identified a0, with α0 less than β. This central first part 83a provides direct injection of the air-fuel mixture into the combustion chamber. The angle α0 is such that the central cone formed by the first part 83a is tangential to the point A0 at the divergent part 51b of the Venturi. As a preference, α0 ranges between 20 and 30 degrees. The second part 83b, positioned at the periphery of the first part 83a, corresponds to the part of the cone 83 of fuel of which the vertex half-angle at the injector outlet ranges between α0 and β and is obtained by indirect injection of some of the air-fuel mixture into the chamber. This indirect injection makes it possible to obtain further carburation which is performed by secondary vaporization of the air-fuel mixture by virtue of this mixture striking the Venturi. The impact is over the entire surface of the interior wall 51 of the Venturi 50 located upstream of the point of tangency A0 between the first part 83a of the cone 83 and the divergent part 51b of the Venturi, as far as a point A1. This point A1 lies upstream of the minimum diameter of the interior profile of the Venturi 50.

For this, for a given nozzle, the shape of the convergent 51a and divergent 51b parts of the Venturi is calculated such that, on the one hand, the axial distance L0 between the downstream end of the head 81 of the injector 80 and the point A0, and, on the other hand, the radius R0 of the interior wall 51 of the Venturi at the point A0, satisfy the following relationship:

$$1.8 < \frac{L0}{R0} < 2.2.$$

The point A1 must, for its part, be located the same distance away from the axis Y as the point A0. Thus, the radius R1 of the internal wall 51 of the Venturi at the point A1 must be equal to the radius R0. In addition, the radius R1 and the axial distance L1 between the downstream end of the head 81 of the injector 80 and the point A1 must satisfy the following relations:

$$R0 = R1 \text{ and } 1.2 < \frac{L1}{R1} < 1.5.$$

Thus, when the primary fuel supply circuit is operating alone, most of the injection of the air-fuel mixture into the combustion chamber is direct injection, whereas a smaller proportion is indirect injection. By meeting the above criteria, this indirect injection is performed in proportions such that the negative effects hitherto observed are appreciably reduced or even disappear altogether. Beneficial and hitherto unseen effects occur. One first beneficial effect is that a secondary vaporization of the air-fuel mixture occurs when this mixture strikes the convergent part 51a of the Venturi 50. This vaporization further reduces the size of the fuel droplets thus improving carburation. A second effect is associated with the fact that whichever fuel supply circuits are operating in the injector, the Venturi is wetted with fuel. It is thus constantly cooled throughout the operation of the turbomachine and the temperature differences which it experiences are far smaller, making it possible to combat the formation and deposition of coke. In addition, the vertex angle of the cone 83 of air-fuel mixture downstream of the Venturi is larger than, when only the primary circuit is operating, when the injection is direct only, without interfering to detrimental effect with the walls of the combustion chamber. That makes it possible to improve the propagation of the flame front and therefore the ability of the chamber to reignite when flying at low mach numbers, that is to say when the turbomachine is running at a low rotational speed. Thus, engine wind-up, that is to say engine acceleration, is also improved because the energy available for acceleration is greater for the same resistive torque to overcome.

The invention claimed is:

1. A turbomachine combustion chamber fuel supply assembly comprising:
   a dual-flow fuel injector which injects a primary flow of fuel delivered by a primary fuel supply circuit and a secondary flow of fuel delivered by a secondary fuel supply circuit, the primary flow of fuel forming a cone of fuel formed by the primary and secondary flows of fuel; and
   an injection device which injects the fuel from the injector, the injection device including a symmetry of revolution about an axis and comprising, positioned from an upstream position to a downstream position in a direction in which the flow of fuel flows, a sliding bushing at the center of which the injector is positioned, radial swirl vanes connected by their downstream end to a bowl, the radial swirl vanes comprising a Venturi equipped with an interior wall that includes an evolving profile with a convergent upstream part connected to a divergent downstream part by a transition region, the Venturi having a minimum inside diameter at the transition region,
   wherein the Venturi has a length, a shape and an axial position such that the cone of fuel from the primary circuit strikes the Venturi,
   wherein the cone of fuel includes, downstream of the Venturi, a vertex half-angle β ranging between 30 and 40 degrees with respect to the axis,
   wherein the cone of fuel includes a central first part and a peripheral second part, the central first part forming a central cone with a vertex half-angle α0, the central cone is tangential at a point A0 that is located on the divergent part of the Venturi, where α0 is less than β, the peripheral second part forming a peripheral cone with a vertex half-angle at the injector outlet ranges between α0 and β,
   wherein the cone of fuel strikes the interior wall of the Venturi over a surface extending from a point A1 located on the convergent part to the point A0 located on the divergent part, the point A1 lying upstream of the minimum inside diameter of the Venturi, and
   wherein the central cone and the peripheral cone correspond to different types of injection.

2. The fuel supply assembly as claimed in claim 1, wherein α0 is between 20 and 30 degrees with respect to the axis.

3. The fuel supply assembly as claimed in claim 1, wherein the point of tangency A0 between the central cone and the divergent downstream part of the Venturi is defined by an axial distance L0 with respect to a downstream end of the injector and by a radial distance R0 with respect to the axis of the injection device, and wherein L0 and R0 satisfy the relationship $$1.8 < \frac{L0}{R0} < 2.2.$$

4. The fuel supply assembly as claimed in claim 1, wherein the point Al which delimits the upstream boundary of the surface of the Venturi struck by the cone of fuel is defined by an axial distance L1 with respect to a downstream end of the injector and by a radial distance R1 with respect to the axis of the injection device, wherein R1 is equal to R0, and wherein L1 and R1 satisfy the relationships R0= R1 and $$1.2 < \frac{L1}{R1} < 1.5.$$

5. A combustion chamber comprising an internal wall, an external wall, a chamber end wall, and which is equipped with at least one fuel supply assembly as claimed in claim 1.

6. A turbomachine equipped with a combustion chamber as claimed in claim 5.

7. The fuel supply assembly as claimed in claim 1, wherein the central cone corresponds to direct injection of an air-fuel mixture into the combustion chamber and the peripheral cone corresponds to indirect injection of the air-fuel mixture into the combustion chamber.

* * * * *

UNITED STATES PATENT AND TRADEMARK OFFICE
CERTIFICATE OF CORRECTION

| | |
|---|---|
| PATENT NO. | : 7,861,529 B2 |
| APPLICATION NO. | : 11/768603 |
| DATED | : January 4, 2011 |
| INVENTOR(S) | : Patrice Andre Commaret et al. |

It is certified that error appears in the above-identified patent and that said Letters Patent is hereby corrected as shown below:

Column 5, line 15, change "a0" to --$\alpha 0$--.

Signed and Sealed this
Nineteenth Day of April, 2011

David J. Kappos
*Director of the United States Patent and Trademark Office*